US010045208B2

(12) United States Patent
Zheng

(10) Patent No.: US 10,045,208 B2
(45) Date of Patent: Aug. 7, 2018

(54) METHOD AND APPARATUS FOR SECURED SOCIAL NETWORKING

(75) Inventor: Yan Zheng, Espoo (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/385,497

(22) PCT Filed: Mar. 31, 2012

(86) PCT No.: PCT/CN2012/073415
§ 371 (c)(1),
(2), (4) Date: Sep. 15, 2014

(87) PCT Pub. No.: WO2013/143144
PCT Pub. Date: Oct. 3, 2013

(65) Prior Publication Data
US 2015/0046696 A1 Feb. 12, 2015

(51) Int. Cl.
*H04W 12/04* (2009.01)
*H04L 9/00* (2006.01)
(Continued)

(52) U.S. Cl.
CPC ............. *H04W 12/04* (2013.01); *H04L 9/006* (2013.01); *H04L 9/083* (2013.01); *H04L 9/088* (2013.01);
(Continued)

(58) Field of Classification Search
CPC ......... H04L 9/006; H04L 9/083; H04L 9/088; H04L 9/16; H04L 63/062; H04W 12/04
See application file for complete search history.

(56) References Cited

U.S. PATENT DOCUMENTS 7,263,619 B1 * 8/2007 Kim ...................... G06F 21/602 713/187
2004/0228492 A1 * 11/2004 Park ...................... H04L 9/0825 380/277

(Continued)

FOREIGN PATENT DOCUMENTS

CN 1741527 A 3/2006
CN 101557289 10/2009

(Continued)

OTHER PUBLICATIONS

A. Lewko et al. "Decentralizing Attribute-Based Encryption", Eurocrypt 2011, pp. 568-588.*

(Continued)

*Primary Examiner* — Robert B Leung
(74) *Attorney, Agent, or Firm* — Mintz Levin Cohn Ferris Glovsky and Popeo, P.C.

(57) ABSTRACT

Various methods are described for using a local trust level and/or a general trust level to control access of data in PSN. Any PSN user can select other users with at least a minimum level of local and/or general trust for secure communications. The users with a trust level below a minimum trust level cannot access the data sent from him/her. The general trust level is controlled by access keys that are generated and issued by a trusted server. The local trust level controlled access keys are generated by each PSN device. Each PSN device issues the corresponding personalized secret keys to those users that satisfy the decryption conditions related to local trust level evaluated by PSN user itself. Both sets of keys can be applied at the same time to secure communication data in PSN controlled by both the general trust level and the local trust level.

18 Claims, 11 Drawing Sheets

(51) Int. Cl.
H04L 9/08 (2006.01)
H04L 9/16 (2006.01)
H04L 29/06 (2006.01)

(52) U.S. Cl.
CPC .............. *H04L 9/16* (2013.01); *H04L 63/062* (2013.01); *H04L 63/0442* (2013.01); *H04L 63/06* (2013.01)

(56) References Cited

U.S. PATENT DOCUMENTS

| | | | | |
|---|---|---|---|---|
| 2005/0114660 | A1* | 5/2005 | Lee | H04L 9/304 713/166 |
| 2006/0233377 | A1* | 10/2006 | Chang | H04L 63/062 380/278 |
| 2008/0084294 | A1 | 4/2008 | Zhiying et al. | |
| 2008/0165974 | A1* | 7/2008 | Inoue | H04L 9/0836 380/279 |
| 2009/0046676 | A1 | 2/2009 | Krishnaswamy et al. | |
| 2009/0049514 | A1 | 2/2009 | Yan et al. | |
| 2009/0125980 | A1* | 5/2009 | Alperovitch | H04L 63/126 726/3 |
| 2009/0276233 | A1 | 11/2009 | Brimhall et al. | |
| 2009/0296939 | A1* | 12/2009 | Struik | H04L 63/065 380/278 |
| 2009/0328148 | A1 | 12/2009 | Lee et al. | |
| 2010/0119068 | A1 | 5/2010 | Harris | |
| 2010/0251334 | A1 | 9/2010 | Xiao et al. | |
| 2010/0262706 | A1* | 10/2010 | Rodriguez | H04L 63/105 709/229 |
| 2010/0329463 | A1* | 12/2010 | Ratliff | H04L 9/0833 380/279 |
| 2011/0110525 | A1* | 5/2011 | Gentry | H04L 9/0822 380/285 |
| 2012/0174219 | A1* | 7/2012 | Hernandez | G06F 21/562 726/22 |
| 2012/0233665 | A1* | 9/2012 | Ranganathan | G06F 21/33 726/4 |

FOREIGN PATENT DOCUMENTS

| | | |
|---|---|---|
| CN | 101707524 | 5/2010 |
| CN | 101969647 A | 2/2011 |
| GB | 2398712 A | 8/2004 |
| GB | 2411801 A | 9/2005 |
| WO | 2006/114751 A2 | 11/2006 |
| WO | 2009/127225 A1 | 10/2009 |
| WO | 2010144301 | 12/2010 |

OTHER PUBLICATIONS

G. Wang et al. "Hierarchical Attribute-Based Encryption for Fine-Grained Access Control in Cloud Storage Services." CCS'10 Proceedings of the 17th ACM Conference on Computer and Communications Security. Oct. 4-8, 2010. pp. 735-737.*
Sun et al., "Defense of Trust Management Vulnerabilities in Distributed Networks", IEEE Communications Magazine, vol. 46, Issue: 2, Feb. 2008, pp. 112-119.
Yan et al., "Trust Modeling and Management: from Social Trust to Digital Trust", Chapter :13, Computer Security, Privacy and Politics: Current Issues, Challenges and Solutions, 2007, pp. 1-26.
Yan et al., "Formalizing Trust Based on Usage Behaviours for Mobile Applications", Proceedings of the 6th International Conference on Autonomic and Trusted Computing, Jul. 2009, pp. 194-208.
Yan, "Trust Modeling and Management in Digital Environments: from Social Concept to System Development", Information science Reference, Jan. 2009, 598 pages.
Dellarocas, "Immunizing Online Reputation Reporting Systems Against Unfair Ratings and Discriminatory Behavior", Proceedings of the 2nd ACM conference on Electronic commerce, Oct. 17-20, 2000, pp. 150-157.

Ekberg et al., "OnBoard Credentials Platform Design and Implementation", NRC-TR-2008-001, Jan. 29, 2008, pp. 1-52.
Salem et al., "Fuelling WiFi Deployment: A Reputation-Based Solution", In Proceedings of WiOpt, 2004, 7 pages.
Sun et al., "A Novel Reputation System Facilitating Cooperation in Pervasive Wireless Environment", Canadian Conference on Electrical and Computer Engineering, vol. 2, May 2-5, 2004, pp. 951-954.
Non-Final Office action received for corresponding U.S. Appl. No. 12/570,031, dated Nov. 2, 2011, 12 pages.
"Advogato's Trust Metric", Advogato, Retrieved on Nov. 28, 2014, Webpage available at : http://www.advogato.org/trust-metric.html.
Stuedi et al., "Demo Abstract—Ad Hoc Social Networking using MAND", The Annual International Conference on Mobile Computing and Networking, Sep. 13-19, 2008, 3 pages.
Bethencourt et al., "Ciphertext-Policy Attribute-Based Encryption", IEEE Symposium on Security and Privacy, May 20-23, 2007, 15 pages.
Goyal et al., "Attribute-Based Encryption for Fine-Grained Access Control of Encrypted Data", Proceedings of the 13th ACM Conference on Computer and Communications Security, Oct. 30-Nov. 3, 2006, pp. 89-98.
Muller et al., "Distributed Attribute-Based Encryption", Proceedings of the 11th Annual International Conference on Information Security and Cryptology, Lecture Notes in Computer Science, vol. 5461, 2009, pp. 20-36.
Sahai et al., "Fuzzy Identity-Based Encryption", Proceedings of 24th International Conference on the Theory and Application of Cryptographic Techniques, 2005, pp. 457-473.
Wang et al., "Hierarchical Attribute-Based Encryption for Fine-Grained Access Control in Cloud Storage Services", Proceedings of the 17th ACM Conference on Computer and Communications Security, Oct. 4-8, 2010, pp. 735-737.
Zhou et al., "Piracy-Preserved Access Control for Cloud Computing", 10th International Conference on Trust, Security and Privacy in Computing and Communications, Nov. 16-18, 2011, pp. 83-90.
Ahtiainen et al., "Awareness Networking in Wireless Environments", IEEE Vehicular Technology Magazine, vol. 4, Issue: 3, Sep. 2009, pp. 48-54.
Yan et al., "AdChatRep: A Reputation System for MANET Chatting", Proceedings of 1st international symposium on From digital footprints to social and community intelligence, Sep. 18, 2011, pp. 43-48.
Lacharite et al., "A Trust-Based Security Architecture for Tactical MANETs", IEEE Military Communications Conference, Nov. 16-19, 2008, pp. 1-7.
Khamayseh et al., "Malicious Nodes Detection in MANETs: Behavioral Analysis Approach", Journal of Networks, vol. 7, No. 1, Jan. 2012, pp. 116-125.
Zhou et al., "Trust Overlay Networks for Global Reputation Aggregation in P2P Grid Computing", 20th International Parallel and Distributed Processing Symposium, Apr. 25-29, 2006, 10 pages.
Chen, "A Privacy-Enhanced Reputation System for Mobile Ad Hoc Services", Master's Thesis, Jun. 28, 2010, 71 pages.
Extended European Search Report received for corresponding European Patent Application No. 12873227.8, dated Nov. 6, 2015, 6 pages.
Ibraimi et al., "Secure Management of Personal Health Records by Applying Attribute-Based Encryption", 6th International Workshop on Wearable Micro and Nano Technologies for Personalized Health, Jun. 24-26, 2009, 4 pages.
Jawad et al., "A Data Privacy Service for Structured P2P Systems", Mexican International Conference on Computer Science, Sep. 21-25, 2009, pp. 45-56.
International Search Report and Written Opinion received for corresponding Patent Cooperation Treaty Application No. PCT/CN2012/073415 , dated Jan. 3, 2013, 18 pages.
Josang et al. "A survey of trust and reputation systems for online service provision". ScienceDirect, Decision Support Systems, 43 (2007) pp. 618-644.

* cited by examiner

METHOD AND APPARATUS FOR SECURED SOCIAL NETWORKING

RELATED APPLICATION

This application was originally filed as PCT Application No. PCT/CN2012/073415 filed Mar. 31, 2012.

TECHNICAL FIELD

Embodiments of the present invention relate generally to communication technology, and, more particularly, relate to a method and apparatus for secured pervasive social networking based on multi-dimensional trust levels.

BACKGROUND

A mobile ad hoc network (MANET) may be configured for use as a platform for a social group when performing social networking activities, e.g., for so called Pervasive Social Networking. A MANET is defined as a collection of autonomous nodes that are configured to communicate with each other by forming a multi-hop radio network and maintaining connectivity in a decentralized manner. A social group may be instantly formed not only by people socially connected, but those persons that are physically in proximity, such as groups for purchase, resource sharing and social events. For example, a person may chat with nearby stranger for instant social needs (e.g. responding to group purchase activities, ride sharing and/or music preferences). This kind of pervasive social networking may be valuable to a mobile user especially if mobile Internet or other wireless networks are unavailable or are costly to access. MANET based instant social networking could be valuable for preserving user privacy and perhaps more than traditional social networking sites.

SUMMARY

Methods, apparatuses, and computer program products are herein provided for controlling access of communications in a Pervasive Social Network (PSN) using a local trust level and/or a general trust level. In some example embodiments, a user operating a communication device on a PSN may select other users with at least a minimum level of local and/or general trust for secure communications. For example, users having a communication device (e.g., a mobile device) with a trust level lower than the minimum level of trust would not be configured to access the secure communications.

In some example embodiments and in an instance in which a trusted server is available, a user may control access to secure communications based on a general trust level that is evaluated by the trusted server. In some example embodiments, the secure communication access based on the general trust level may be controlled by keys (e.g., an encryption public key and one or more personalized decryption keys) that are generated and issued by the trusted server.

In other example embodiments, the user may control communication data access based on both a general trust level and a local trust level. For example, based on periodically issued keys from the server and locally generated keys, the user may further control the access of its secure communications by encrypting its messages using both the key issued by the server corresponding to the general trust level and the key generated by its local device corresponding to the local trust level. The user may then broadcast encrypted messages to nearby communication devices that may be decrypted using the personalized secret keys issued by both the trusted server and the user device that encrypts the message.

Alternatively or additionally, in an instance in which the server is not available, each user having a communication device on the PSN may generate an encryption key and corresponding personalized secret keys based on a determined local trust level for encryption and decryption of PSN communication data. The user communication device is configured to evaluate the current local trust levels of other communication devices and set the communication data access policy for itself. The user may then issue the keys to those users that satisfy the decryption conditions (e.g., data access conditions, concretely meet or satisfy an expected local trust level). The user may then broadcast encrypted messages to nearby communication devices that may be decrypted using the issued keys.

In one embodiment, a method is provided that comprises determining a general trust level for one or more users. The method of this embodiment may also include generating a public encryption key and one or more personalized decryption secret keys for the one or more users based on the general trust levels of the one or more users. The method of this embodiment may also include causing the public encryption key and the one or more personalized decryption secret keys to be issued to the one or more users. In some example embodiments, the one or more users are configured to encrypt a message based on the public encryption key. In some example embodiments, the one or more users are configured to decrypt the message using the corresponding personalized secret decryption keys if the access control conditions are satisfied (e.g., its general trust level satisfies an expected level).

In another embodiment, an apparatus is provided that includes at least one processor and at least one memory including computer program code with the at least one memory and the computer program code being configured, with the at least one processor, to cause the apparatus to at least determine a general trust level for one or more users. The at least one memory and computer program code may also be configured to, with the at least one processor, cause the apparatus to generate a public encryption key and one or more personalized decryption secret keys for the one or more users based on the general trust levels of the one or more users. The at least one memory and computer program code may also be configured to, with the at least one processor, cause the apparatus to cause the public encryption key and the personalized decryption secret keys to be issued to the one or more users. In some example embodiments, the one or more users are configured to encrypt a message based on the public encryption key. In some example embodiments, the one or more users are configured to decrypt the message using one or more corresponding personalized secret decryption keys if the access control conditions are satisfied (e.g., its general trust level satisfies an expected level).

In a further embodiment, a computer program product may be provided that includes at least one non-transitory computer-readable storage medium having computer-readable program instructions stored therein with the computer-readable program instructions including program instructions configured to determine a general trust level for one or more users. The computer-readable program instructions may also include program instructions configured to generate a public encryption key and one or more personalized decryption secret keys for the one or more users based on the general trust levels of the one or more users. The computer-readable program instructions may also include program instructions configured to cause the public encryption key and the personalized decryption secret keys to be issued to the one or more users. In some example embodiments, the one or more users are configured to encrypt a message based on the public encryption key. In some example embodiments, the one or more users are configured to decrypt the message using one or more corresponding personalized secret decryption keys if the access control conditions are satisfied (e.g., its general trust level satisfies an expected level).

In yet another embodiment, an apparatus is provided that includes means for determining a general trust level for one or more users. The apparatus of this embodiment may also include means for generating a public encryption key and one or more personalized decryption secret keys for the one or more users based on the general trust levels of the one or more users. The apparatus of this embodiment may also include means for causing the public encryption key and the personalized decryption secret keys to be issued to the one or more users. In some example embodiments, the one or more users are configured to encrypt a message based on the public encryption key. In some example embodiments, the one or more users are configured to decrypt the message using one or more corresponding personalized secret decryption keys if the access control conditions are satisfied (e.g., its general trust level satisfies an expected level).

In one embodiment, a method is provided that comprises receiving a request for a key from one or more users. The method of this embodiment may also include generating a public encryption key and one or more personalized decryption secret keys based on a local trust level for decryption for the one or more users who satisfy the local trust level. The method of this embodiment may also include causing the personalized decryption secret keys to be issued to one or more users in an instance in which the one or more users satisfy the local trust level for decryption. In some example embodiments, the one or more users are configured to decrypt the message using the corresponding personalized secret decryption key.

In another embodiment, an apparatus is provided that includes at least one processor and at least one memory including computer program code with the at least one memory and the computer program code being configured, with the at least one processor, to cause the apparatus to at least receive a request for a key from one or more users. The at least one memory and computer program code may also be configured to, with the at least one processor, cause the apparatus to generate a public encryption key and one or more personalized decryption secret key based on a local trust level for decryption for the one or more users who satisfy the local trust level. The at least one memory and computer program code may also be configured to, with the at least one processor, cause the apparatus to cause the personalized decryption secret key to be issued to one or more users in an instance in which the one or more users satisfy the local trust level for decryption. In some example embodiments, the one or more users are configured to decrypt the message using the corresponding personalized secret decryption key.

In a further embodiment, a computer program product may be provided that includes at least one non-transitory computer-readable storage medium having computer-readable program instructions stored therein with the computer-readable program instructions including program instructions configured to receive a request for a key from one or more users. The computer-readable program instructions may also include program instructions configured to generate a public encryption key and one or more personalized decryption secret keys based on a local trust level for decryption for the one or more users who satisfy the local trust level. The computer-readable program instructions may also include program instructions configured to cause the personalized decryption secret key to be issued to one or more users in an instance in which the one or more users satisfy the local trust level for decryption. In some example embodiments, the one or more users are configured to decrypt the message using the corresponding personalized secret decryption key.

In yet another embodiment, an apparatus is provided that includes means for receiving a request for a key from one or more users. The apparatus of this embodiment may also include means for generating a public encryption key and one or more personalized decryption secret keys based on a local trust level for decryption for the one or more users who satisfy the local trust level. The apparatus of this embodiment may also include means for causing the personalized decryption secret key to be issued to one or more users in an instance in which the one or more users satisfy the local trust level for decryption. In some example embodiments, the one or more users are configured to decrypt the message using the corresponding personalized secret decryption key.

In one embodiment, a method is provided that comprises receiving a public encryption key and a personalized decryption secret key from a trusted server. The method of this embodiment may also include encrypting a message configured to be broadcast to a plurality of users, the message being encrypted based on an access policy and the public encryption key. In some example embodiments, the one or more users are configured to decrypt the message using the corresponding personalized secret decryption keys in an instance in which the access control conditions are satisfied.

In another embodiment, an apparatus is provided that includes at least one processor and at least one memory including computer program code with the at least one memory and the computer program code being configured, with the at least one processor, to cause the apparatus to at least receive a public encryption key and a personalized decryption secret key from a trusted server. The at least one memory and computer program code may also be configured to, with the at least one processor, cause the apparatus to encrypt a message configured to be broadcast to a plurality of users, the message being encrypted based on an access policy and the public encryption key. In some example embodiments, the one or more users are configured to decrypt the message using the corresponding personalized secret decryption keys in an instance in which the access control conditions are satisfied.

In a further embodiment, a computer program product may be provided that includes at least one non-transitory computer-readable storage medium having computer-readable program instructions stored therein with the computer-readable program instructions including program instructions configured to receive a public encryption key and a personalized decryption secret key from a trusted server. The computer-readable program instructions may also include program instructions configured to encrypt a message configured to be broadcast to a plurality of users, the message being encrypted based on an access policy and the public encryption key. In some example embodiments, the one or more users are configured to decrypt the message using the corresponding personalized secret decryption keys in an instance in which the access control conditions are satisfied.

In yet another embodiment, an apparatus is provided that includes means for receiving a public encryption key and a personalized decryption secret key from a trusted server. The apparatus of this embodiment may also include means for encrypting a message configured to be broadcast to a plurality of users, the message being encrypted based on an access policy and the public encryption key. In some example embodiments, the one or more users are configured to decrypt the message using the corresponding personalized secret decryption keys in an instance in which the access control conditions are satisfied.

In one embodiment, a method is provided that comprises receiving a public encryption key and a personalized decryption secret key from a trusted server. The method of this embodiment may also include generating a public encryption key and personalized decryption secret keys based on a local trust level for decryption for the one or more users. The method of this embodiment may also include encrypting a message configured to be broadcast to a plurality of users, the message being encrypted based on an access policy using the public encryption key received from the trusted server and the locally generated public encryption key. In some example embodiments, the access policy is defined in terms of a general trust level and a local trust level. In some example embodiments, the encrypted message may be decrypted using one or more personalized decryption secret keys issued by the trusted server and the one or more personalized decryption secret keys generated based on the local trust level in an instance in which a user of the plurality of users satisfies the access policy.

In another embodiment, an apparatus is provided that includes at least one processor and at least one memory including computer program code with the at least one memory and the computer program code being configured, with the at least one processor, to cause the apparatus to at least receive a public encryption key and a personalized decryption secret key from a trusted server. The at least one memory and computer program code may also be configured to, with the at least one processor, cause the apparatus to generate a public encryption key and personalized decryption secret keys based on a local trust level for decryption for the one or more users. The at least one memory and computer program code may also be configured to, with the at least one processor, cause the apparatus to encrypt a message configured to be broadcast to a plurality of users, the message being encrypted based on an access policy using the public encryption key received from the trusted server and the locally generated public encryption key. In some example embodiments, the access policy is defined in terms of a general trust level and a local trust level. In some example embodiments, the encrypted message may be decrypted using one or more personalized decryption secret keys issued by the trusted server and the one or more personalized decryption secret keys generated based on the local trust level in an instance in which a user of the plurality of users satisfies the access policy.

In the further embodiment, a computer program product may be provided that includes at least one non-transitory computer-readable storage medium having computer-readable program instructions stored therein with the computer-readable program instructions including program instructions configured to receive a public encryption key and a personalized decryption secret key from a trusted server. The computer-readable program instructions may also include program instructions configured to generate a public encryption key and personalized decryption secret keys based on a local trust level for decryption for the one or more users. The computer-readable program instructions may also include program instructions configured to encrypt a message configured to be broadcast to a plurality of users, the message being encrypted based on an access policy using the public encryption key received from the trusted server and the locally generated public encryption key. In some example embodiments, the access policy is defined in terms of a general trust level and a local trust level. In some example embodiments, the encrypted message may be decrypted using one or more personalized decryption secret keys issued by the trusted server and the one or more personalized decryption secret keys generated based on the local trust level in an instance in which a user of the plurality of users satisfies the access policy.

In yet another embodiment, an apparatus is provided that includes means for receiving a public encryption key and a personalized decryption secret key from a trusted server. The apparatus of this embodiment may also include means for generating a public encryption key and personalized decryption secret keys based on a local trust level for decryption for the one or more users. The apparatus of this embodiment may also include means for encrypting a message configured to be broadcast to a plurality of users, the message being encrypted based on an access policy using the public encryption key received from the trusted server and the locally generated public encryption key. In some example embodiments, the access policy is defined in terms of a general trust level and a local trust level. In some example embodiments, the encrypted message may be decrypted using one or more personalized decryption secret keys issued by the trusted server and the one or more personalized decryption secret keys generated based on the local trust level in an instance in which a user of the plurality of users satisfies the access policy.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described some example embodiments of the invention in general terms, reference will now be made to the accompanying drawings, which are not necessarily drawn to scale, and wherein:

DETAILED DESCRIPTION

Figure 1:
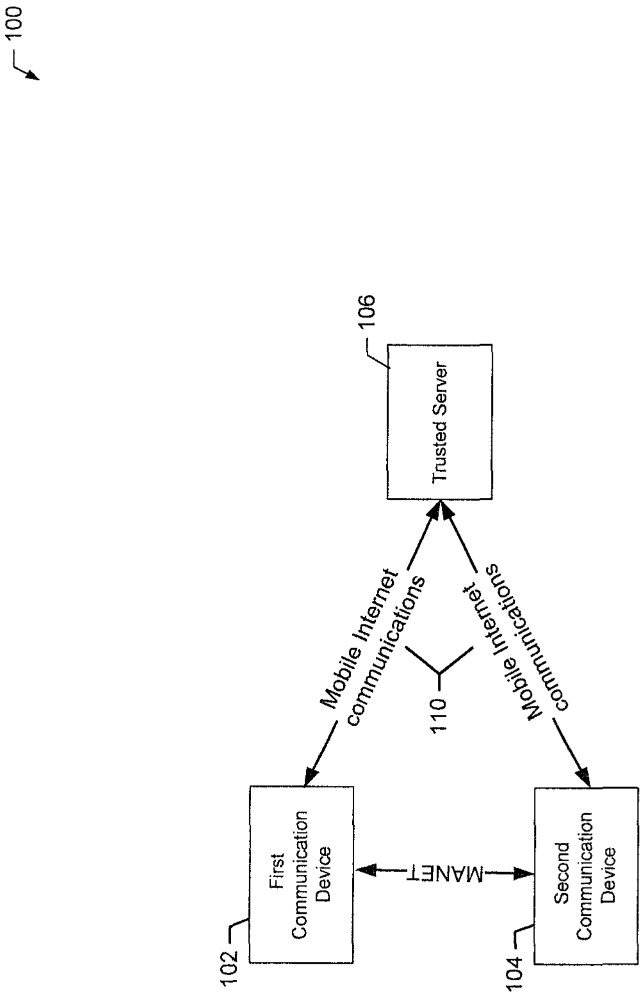
FIG. 1 illustrates a block diagram of a system for securing a PSN communication using a local trust level and/or a general trust level.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

The terms "data," "content," "information," and similar terms may be used interchangeably, according to some example embodiments of the present invention, to refer to data capable of being transmitted, received, operated on, displayed, and/or stored. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a floppy disk, a flexible disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term 'circuitry' refers to all of the following: (a) hardware-only circuit implementations (such as implementations in only analog and/or digital circuitry); (b) to combinations of circuits and computer program product(s) comprising software (and/or firmware instructions stored on one or more computer readable memories), such as (as applicable): (i) to a combination of processor(s) or (ii) to portions of processor(s)/software (including digital signal processor(s)), software, and memory(ies) that work together to cause an apparatus, such as a mobile phone or server, to perform various functions described herein); and (c) to circuits, such as, for example, a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, other network device, and/or other computing device.

Trust plays an important role in the pervasive social networking for reciprocal activities among nearby strangers. For example, it helps people overcome a perception of uncertainty and risk and allows those persons to engage in trust related behaviors. During instant social activities or instant social networks, users are not necessarily acquaintances, but instead are more likely to be strangers. Therefore, users balance the benefits received from instant social networks with the risks of communications with strangers. Therefore, it is important to determine a trust level between strangers and enable a user to determine how much to trust a stranger in order to make decisions. There is a demand for a practical reputation system for MANET based pervasive social networking that is configured to assist users of communication devices to trust other users.

As described herein, trust is a measure derived from direct or indirect knowledge, experience and/or interaction with an entity or user. Trust is used to assess the level of belief and dependence put onto an entity or other users. For example, trust may be derived based on locally accumulated data at MANET communication devices and a general trust value may be determined based on historical accumulated social records at a trusted server.

In execution and according to some example embodiments, MANET provides a generic platform for pervasive social networking. Various instant social activities may be supported by the MANET platform. For communications in PSN on a MANET it may be essential to use secure communications between trustworthy users to avoid malicious eavesdropping. In some cases, a centralized solution may be used to control data access based on general trust levels generated by a trusted server. In some cases (e.g., disaster, military activity and/or the like), however, a centralized server is not available or the server is the target of some sort of attacks. Further, due to the characteristics of PSN topology and the frequent changes of a user's trust level, for securing PSN communications, a decryption key may need to be frequently changed and then distributed to each eligible user.

The systems and methods as described herein are therefore configured to secure PSN communications using a local trust level and/or a general trust level. Thus, the communications can be secured based on keys issued by a communication device, a trusted server or both depending on availability and user preference. Alternatively or additionally, the communication device and/or the trusted server may monitor nearby communication devices for a modification of a trust level to either regenerate keys or resend keys to eligible users. In some example embodiments a communication device may have a reduced trust level and any keys received by that communication device may then be allowed to expire.

Referring now to FIG. 1, FIG. 1 illustrates a block diagram of a system 100 for securing PSN communications using a local trust level and/or a general trust level. It will be appreciated that the system 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for setting general trust levels and local trust levels; numerous other configurations may also be used to implement embodiments of the present invention.

The system 100 may include a first communication device 102, a second communication device 104 and/or one or more trusted servers 106. In some example embodiments, an additional plurality of communication devices may be included, such as the first communication device 102 and the second communication device 104. The system 100 may further comprise a network 108. The network 108 may comprise a PSN based on a MANET. According to various embodiments, the first communication device 102 and/or the second communication device 104 may be configured to connect directly with one or more trusted servers 106 via 110, for example, via wireless local LAN, a mobile network or mobile Internet access point.

A first communication device 102 and/or a second communication device 104 may be embodied as any computing device, such as, for example, a desktop computer, laptop computer, mobile terminal, mobile computer, mobile phone, smartphone, user equipment, mobile communication device, tablet computing device, pad, game device, digital camera/camcorder, audio/video player, television device, radio receiver, digital video recorder, positioning device, wrist watch, portable digital assistant (PDA), fixed transceiver device (for example, attached to traffic lights, energy meters, light bulbs, and/or the like), a sensor, an actuator, a chipset, an apparatus comprising a chipset, any combination thereof, and/or the like. The network 108 and/or the connection between the first communication device 102/the second communication device 104 and the trusted server 106 may comprise one or more wireless networks (e.g., a cellular network, wireless local area network, wireless metropolitan area network, and/or the like), one or more wireline networks (e.g., a wired local area network, a wired wide area network, and/or the like), or some combination thereof, and in some embodiments comprises at least a portion of the internet.

Figure 2:
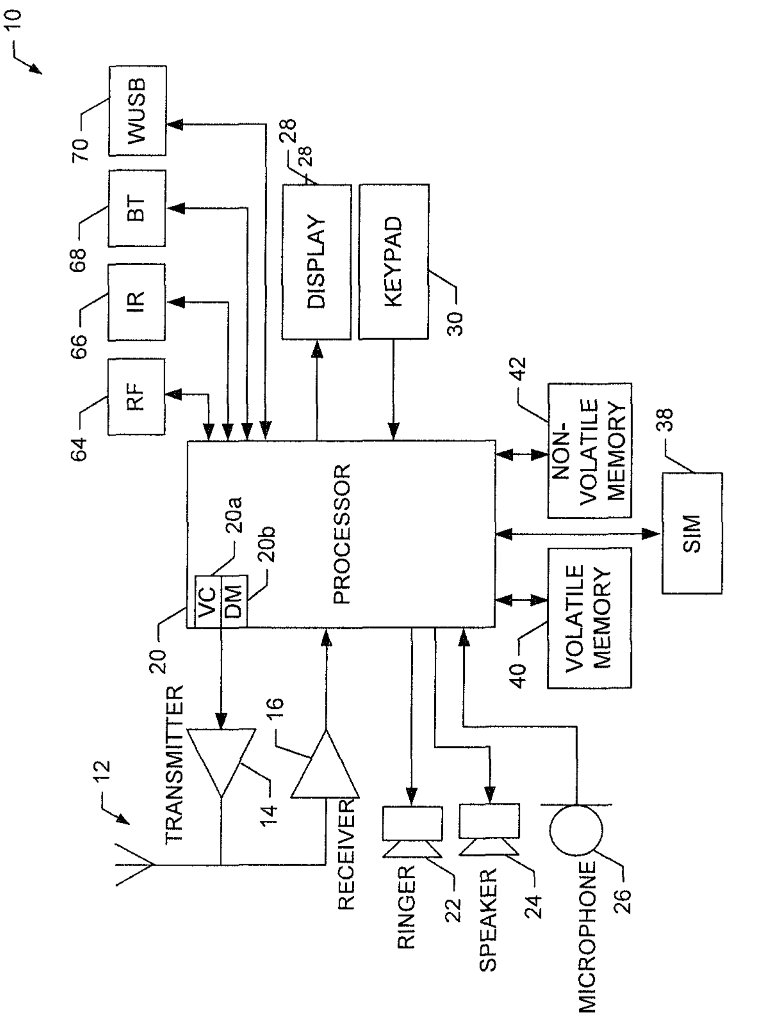
FIG. 2 illustrates a block diagram of a mobile terminal representative of one embodiment of a communication device.

In some example embodiments, a first communication device 102 and/or a second communication device 104 may be embodied as an example mobile terminal, such as that illustrated in FIG. 2. In this regard, FIG. 2 illustrates a block diagram of a mobile terminal 10 representative of one embodiment of a first communication device 102 and/or a second communication device 104. It should be understood, however, that the mobile terminal 10 illustrated and hereinafter described is merely illustrative of one type of computing device (for example, first communication device 102 and/or a second communication device 104) that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some example embodiments the processor 20 may comprise a plurality of processors. These signals sent and received by the processor 20 may include signaling information in accordance with an air interface standard of an applicable cellular system, and/or any number of different wireline or wireless networking techniques (e.g. communications between a first communication device 102 and a second communication device 104, and/or between a first communication device 102/second communications device 104 and a trusted server 106), comprising but not limited to WiFi, wireless local access network (WLAN) techniques such as Bluetooth™ (BT), Ultra-wideband (UWB), Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various mobile communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols such as LTE Advanced and/or the like as well as similar wireless communication protocols that may be developed in the future. The mobile terminal may be capable in operating with various IEEE and IETF standards, for example IEEE 802.11 standard for wireless fidelity (Wi-Fi) or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20*a*, an internal data modem (DM) 20*b*, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), Constrained Application Protocol (CoAP) and/or the like. The mobile terminal 10 may be capable of using Transmission Control Protocol/Internet Protocol (TCP/IP) to transmit and receive web content across the interne or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to low power/energy or ultra-low power/energy Bluetooth™ technology (for example, Bluetooth Low Energy and/or Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including 6LoWpan, WiFi, WiFi low power, WLAN techniques such as IEEE 802.11 techniques, IEEE 802.15 techniques, IEEE 802.16 techniques, and/or the like.

The mobile terminal 10 may comprise memory, such as a removable or non-removable subscriber identity module (SIM) 38, a soft SIM 38, a fixed SIM 38, a removable or non-removable universal subscriber identity module (USIM) 38, a soft USIM 38, a fixed USIM 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may comprise a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
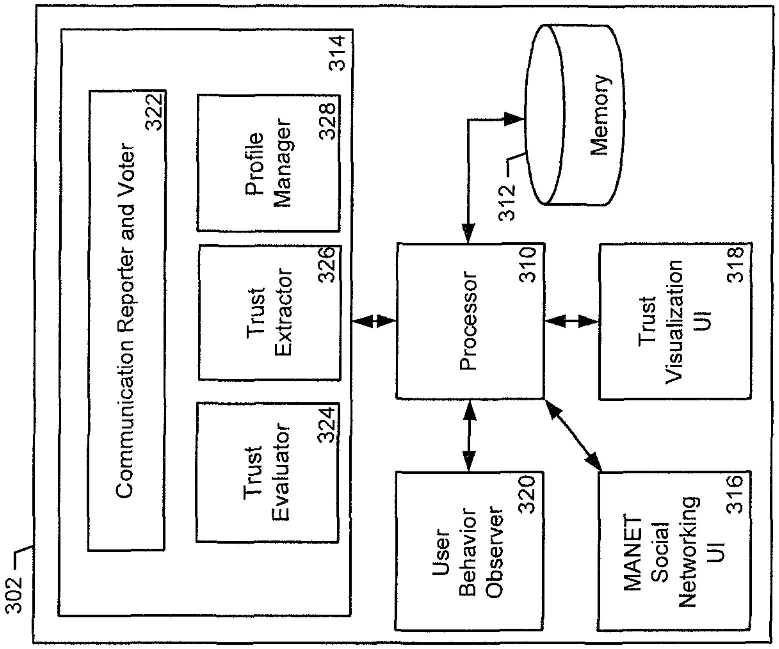
FIG. 3 illustrates a block diagram of a first communication device and/or a second communication device according to some example embodiments.

Referring now to FIG. 3, FIG. 3 illustrates a block diagram of a first communication device 102 and/or a second communication device 104 according to some example embodiments. In some example embodiments, the first communication device 102 and/or the second communication device 104 may comprise various means for performing the various functions herein described. These means may comprise one or more of a processor 310, memory 312, communication interface 314, MANET social network user interface 316, trust visualization user interface 318 and/or user behavior observer 320. The means of the first communication device 102 and/or the second communication device 104 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 312) that is executable by a suitably configured processing device (for example, the processor 310), or some combination thereof.

In some example embodiments, one or more of the means illustrated in FIG. 3 may be embodied as a chip or chip set. In other words, the first communication device 102 and/or the second communication device 104 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 310, memory 312, communication interface 314, MANET social network user interface 316, trust visualization user interface 318 and/or user behavior observer 320 may be embodied as a chip or chip set. The first communication device 102 and/or the second communication device 104 may therefore, in some example embodiments, be configured to implement embodiments of the present invention on a single chip or as a single "system on a chip." As another example, in some example embodiments, the first communication device 102 and/or the second communication device 104 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 310 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, one or more other hardware processors, or some combination thereof. Accordingly, although illustrated in FIG. 3 as a single processor, in some embodiments the processor 310 may comprise a plurality of processors. The plurality of processors may be in operative communication with each other and may be collectively configured to perform one or more functionalities of the first communication device 102 and/or the second communication device 104 as described herein. The plurality of processors may be embodied on a single computing device or distributed across a plurality of computing devices collectively configured to function as the first communication device 102 and/or the second communication device 104. In embodiments wherein the first communication device 102 and/or the second communication device 104 is embodied as a mobile terminal 10, the processor 310 may be embodied as or comprise the processor 20. In some example embodiments, the processor 310 is configured to execute instructions stored in the memory 312 or otherwise accessible to the processor 310. These instructions, when executed by the processor 310, may cause the first communication device 102 and/or the second communication device 104 to perform one or more of the functionalities of the first communication device 102 and/or the second communication device 104 as described herein. As such, whether configured by hardware or software methods, or by a combination thereof, the processor 310 may comprise an entity capable of performing operations according to embodiments of the present invention while configured accordingly. Thus, for example, when the processor 310 is embodied as an ASIC, FPGA or the like, the processor 310 may comprise specifically configured hardware for conducting one or more operations described herein. Alternatively, as another example, when the processor 310 is embodied as an executor of instructions, such as may be stored in the memory 312, the instructions may specifically configure the processor 310 to perform one or more algorithms and operations described herein.

The memory 312 may comprise, for example, volatile memory, non-volatile memory, or some combination thereof. In this regard, the memory 312 may comprise one or more tangible and/or non-transitory computer-readable storage media that may include volatile and/or non-volatile memory. Although illustrated in FIG. 3 as a single memory, the memory 312 may comprise a plurality of memories. The plurality of memories may be embodied on a single computing device or may be distributed across a plurality of computing devices collectively configured to function as the first communication device 102 and/or the second communication device 104. In various example embodiments, the memory 312 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the first communication device 102 and/or the second communication device 104 is embodied as a mobile terminal 10, the memory 312 may comprise the volatile memory 40 and/or the non-volatile memory 42. The memory 312 may be configured to store information, data, applications, instructions, or the like for enabling the first communication device 102 and/or the second communication device 104 to carry out various functions in accordance with various example embodiments. For example, in some example embodiments, the memory 312 is configured to buffer input data for processing by the processor 310. Additionally or alternatively, the memory 312 may be configured to store program instructions for execution by the processor 310. The memory 312 may store information in the form of static and/or dynamic information. This stored information may be stored and/or used by the communication interface 314, MANET social network user interface 316, and/or trust visualization user interface 318 during the course of performing its functionalities. In some example embodiments, the memory 312 may take the form of a trust dataset. The trust dataset may be configured to store data related to the communication interface 314, MANET social network user interface 316, trust visualization user interface 318 and/or the user behavior observer 320.

The communication interface 314 may be embodied as any device or means embodied in circuitry, hardware, a computer program product comprising computer readable program instructions stored on a computer readable medium (for example, the memory 312) and executed by a processing device (for example, the processor 310), or a combination thereof that is configured to receive and/or transmit data from/to another computing device. In an example embodiment, the communication interface 314 may be at least partially embodied as or otherwise controlled by the processor 310. In this regard, the communication interface 314 may be in communication with the processor 310, such as via a bus. The communication interface 314 may include, for example, an antenna, a transmitter, a receiver, a transceiver and/or supporting hardware or software for enabling communications with one or more remote computing devices. In some example embodiments, the communication interface 314 takes the form of a modem. The communication interface 314 may be configured to receive and/or transmit data using any protocol that may be used for communications between computing devices. In this regard, the communication interface 314 may be configured to receive and/or transmit data using any protocol that may be used for transmission of data over a wireless network, cellular radio network, wireline network, some combination thereof, or the like by which the first communication device 102 and/or the second communication device 104 and one or more computing devices or computing resources may be in communication. As an example, the communication interface 314 may be configured to enable communications between the first communication device 102 and another device, such as the second communication device 104. As a further example, the communication interface 314 may be configured to enable communication with a trusted server 106 via the network 108. The communication interface 314 may additionally be in communication with the memory 312, MANET social network user interface 316, trust visualization user interface 318 and/or the user behavior observer 320, such as via a bus.

In an example embodiment, the communication interface 314 may comprise various means for performing the various functions herein described. These means may comprise one or more of a communications reporter and voter 322, a trust evaluator 324, a trust extractor 326 and/or a profile manager 328. In some example embodiments, the communications reporter and voter 322 may be configured to cause communications records and local trust level information to be transmitted to the trusted server 106. Additionally, the communications reporter and voter 322 may further be configured to process a vote for an increased or decreased trust level for another user and/or entity.

In some example embodiments, a trust evaluator 324 may be configured to evaluate a user's and/or an entities local trust level, for example the level of trust of a user of a nearby communication device. The trust evaluator 324 may also be configured to report a local trust level to the trust visualization user interface 318. In some example embodiments, a trust extractor 326 may be configured to receive trust tokens issued by the trusted server 106. A trust token is configured to contain a communication device user's general trust level value, public and personalized secret keys of the attributes and a valid time period for the keys).

In some example embodiments, the profile manager 328 is configured to maintain communication device user's personal information. In some cases, the profile manager is configured to cause a communication to the trusted server 106 to be initiated in an instance in which a communication device is to be registered and/or to update a communication device user's pseudonym and/or trust token.

The MANET social network user interface 316 and/or trust visualization user interface 318 may be in communication with the processor 310 to receive an indication of a user input and/or to provide an audible, visual, mechanical, or other output to a user. As such, the MANET social network user interface 316 and/or trust visualization user interface 318 may include, for example, a keyboard, a mouse, a trackpad, a display, a touch screen display, a microphone, a speaker, and/or other input/output mechanisms. In embodiments wherein the MANET social network user interface 316 and/or trust visualization user interface 318 comprises a touch screen display may additionally be configured to detect and/or receive indication of a touch gesture or other input to the touch screen display. In some example embodiments, the MANET social network user interface 316 (i.e., a set of pervasive social networking applications, e.g., TWIN, GhostTalk, Facebook/LinkedIn friends) is configured to provide a user interface for a communication device user to participate in social networking. The MANET social network user interface 316 and/or trust visualization user interface 318 may be in communication with the memory 312, communication interface 314, and/or the user behavior observer 320, such as via a bus.

The user behavior observer 320 may be embodied as various means, such as circuitry, hardware, a computer program product comprising computer readable program instructions stored on a computer readable medium (for example, the memory 312) and executed by a processing device (for example, the processor 310), or some combination thereof and, in some embodiments, is embodied as or otherwise controlled by the processor 310. In embodiments wherein the user behavior observer 320 is embodied separately from the processor 310, the communication user behavior observer 320 may be in communication with the processor 310. In some example embodiments, the user behavior observer 320 is configured to record communication device social behaviors. The user behavior observer 320 may further be in communication with one or more of the memory 312, communication interface 314, MANET social network user interface 316 and/or the trust visualization user interface 318, such as via a bus.

Figure 4:
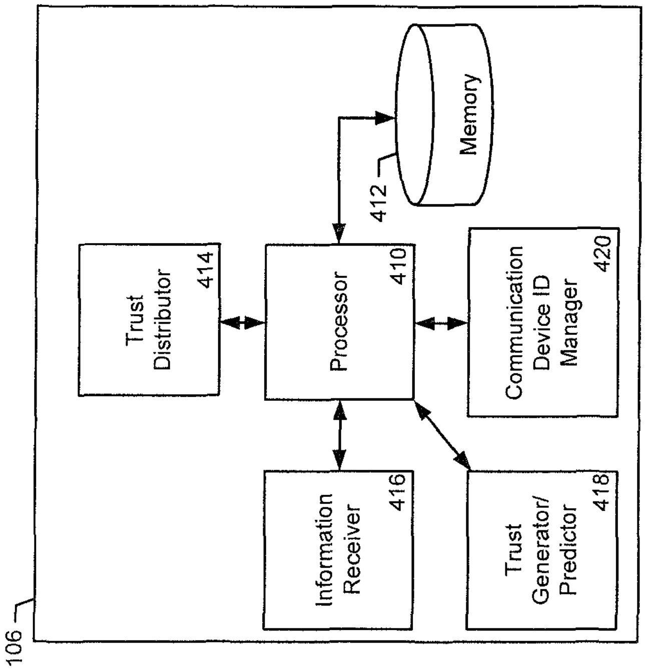
FIG. 4 illustrates a block diagram of a trusted server according to an example embodiment.

Referring now to FIG. 4, FIG. 4 illustrates a block diagram of a trusted server 106 according to an example embodiment. In the example embodiment, the trusted server may comprise various means for performing the various functions herein described. These means may comprise one or more of a processor 410, memory 412, a trust distributor 414, an information receiver 416, a trust generator/predictor 418 and/or a communication device identification (ID) manager 420. The means of the trusted server 106 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example, memory 412) that is executable by a suitably configured processing device (for example, the processor 410), or some combination thereof.

In some example embodiments, one or more of the means illustrated in FIG. 4 may be embodied as a chip or chip set. In other words, the trusted server 106 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 410, memory 412, trust distributor 414, information receiver 416, trust generator/predictor 418 and/or communication device ID manager 420 may be embodied as a chip or chip set. The trusted server 106 may therefore, in some example embodiments, be configured to implement embodiments of the present invention on a single chip or as a single "system on a chip." As another example, in some example embodiments, the trusted server 106 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 410 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA (field programmable gate array), one or more other hardware processors, or some combination thereof. Accordingly, although illustrated in FIG. 4 as a single processor, in some embodiments the processor 410 may comprise a plurality of processors. The plurality of processors may be in operative communication with each other and may be collectively configured to perform one or more functionalities of the trusted server 106 as described herein. The plurality of processors may be embodied on a single computing device or distributed across a plurality of computing devices collectively configured to function as the trusted server 106. In some example embodiments, the processor 410 may be configured to execute instructions stored in the memory 412 or otherwise accessible to the processor 410. These instructions, when executed by the processor 410, may cause the trusted server 106 to perform one or more of the functionalities of the trusted server 106 as described herein. As such, whether configured by hardware or software methods, or by a combination thereof, the processor 410 may comprise an entity capable of performing operations according to embodiments of the present invention while configured accordingly. Thus, for example, when the processor 410 is embodied as an ASIC, FPGA or the like, the processor 410 may comprise specifically configured hardware for conducting one or more operations described herein. Alternatively, as another example, when the processor 410 is embodied as an executor of instructions, such as may be stored in the memory 412, the instructions may specifically configure the processor 410 to perform one or more algorithms and operations described herein.

The memory 412 may comprise, for example, volatile memory, non-volatile memory, or some combination thereof. In this regard, the memory 412 may comprise a non-transitory computer-readable storage medium. Although illustrated in FIG. 4 as a single memory, the memory 412 may comprise a plurality of memories. The plurality of memories may be embodied on a single computing device or may be distributed across a plurality of computing devices collectively configured to function as the trusted server 106. In various example embodiments, the memory 412 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 412 may be configured to store information, data, applications, instructions, or the like for enabling the trusted server 106 to carry out various functions in accordance with various example embodiments. For example, in some example embodiments, the memory 412 may be configured to buffer input data for processing by the processor 410. In some example embodiments, the memory 412 may take the form of a trusted server database and is configured to store records reported by communication device, as well as a trust token for each communication device as well as the communication device identification and pseudonyms. Additionally or alternatively, the memory 412 may be configured to store program instructions for execution by the processor 410. The memory 412 may store information in the form of static and/or dynamic information.

The trust distributor 414 and the information receiver 416 may be embodied as any device or means embodied in circuitry, hardware, a computer program product comprising computer readable program instructions stored on a computer readable medium (for example, the memory 412) and executed by a processing device (for example, the processor 410), or a combination thereof that is configured to receive and/or transmit data from/to another computing device. In an example embodiment, the trust distributor 414 and the information receiver 416 may be at least partially embodied as or otherwise controlled by the processor 410. In this regard, the trust distributor 414 and the information receiver 416 may be in communication with the processor 410, such as via a bus. The trust distributor 414 and the information receiver 416 may include, for example, an antenna, a transmitter, a receiver, a transceiver and/or supporting hardware or software for enabling communications with one or more remote computing devices. The trust distributor 414 and the information receiver 416 may be configured to receive and/or transmit data using any protocol that may be used for communications between computing devices. In this regard, the trust distributor 414 and the information receiver 416 may be configured to receive and/or transmit data using any protocol that may be used for transmission of data over a wireless network, wireline network, some combination thereof, or the like by which the trusted server 106 and one or more computing devices or computing resources may be in communication. In some example embodiments, the trust distributor 414 may be configured to distribute trust tokens containing the communication device user's general trust value to each communication device periodically. The information receiver 416 may be configured to collect records reported by the communication device and is configured to store them in the memory 412. The trust distributor 414 and the information receiver 416 may additionally be in communication with the processor 410, the memory 412, the trust generator/predictor 418 and/or the communication device identification manager 420 such as via a bus.

The trust generator/predictor 418 may be embodied as various means, such as circuitry, hardware, a computer program product comprising computer readable program instructions stored on a computer readable medium (for example, the memory 412) and executed by a processing device (for example, the processor 410), or some combination thereof and, in some embodiments, is embodied as or otherwise controlled by the processor 410. In embodiments wherein the trust generator/predictor 418 is embodied separately from the processor 410, the trust generator/predictor 418 may be in communication with the processor 410. In some example embodiments, the trust generator/predictor 418 is configured to calculate trust values for the one or more communication devices. In some example embodiments, the trust generator/predictor 418 may also be configured to identify malicious communication devices.

The communication device identification manager 420 may be embodied as various means, such as circuitry, hardware, a computer program product comprising computer readable program instructions stored on a computer readable medium (for example, the memory 412) and executed by a processing device (for example, the processor 410), or some combination thereof and, in some embodiments, is embodied as or otherwise controlled by the processor 410. In embodiments wherein the communication device identification manager 420 is embodied separately from the processor 410, the communication device identification manager 420 may be in communication with the processor 410. In some example embodiments, the communication device identification manager 420 is configured to register communication devices and is further configured to issue new communication device pseudonyms either by request or periodically.

Referring again to FIG. 1, during system setup, a public master key (PK) and a secret master key (MK) may be generated by the trusted server 106. The PK may be made available to the first communication device 102 and/or second communication device 104, whereas the MK may be stored at the trusted server 106. Each of first communication device 102 and/or second communication device 104 maintains a public user key (PK_u), which is used by trusted server 106 to generate personalized secret attribute keys, and a user secret key (SK_u), which is configured for a decryption operation related to PK_u.

In some example embodiments, the trusted server is configured to generate and distribute the PK_u and SK_u to at least the first communication device 102 and/or second communication device 104. The trusted server 106 is further configured to verify the identity of a user of a communication device before the keys (e.g. PK_u and SK_u) are generated and issued during registration of the first communication device 102 and/or second communication device 104 into the PSN. The keys SK_u and PK_u of a first communication device 102 and/or second communication device 104 are bound to the unique identity of the user of the first communication device 102 and/or second communication device 104 by the trusted server 106. This binding is used for the verification of the user's attributes.

In some example embodiments, the trusted server 106 is configured to maintain a secret key (SK_gt) which is used to issue secret attribute keys to users based on the general trust level, which is denoted by the attribute general trust (GT). As is described herein, an attribute consists of an identifier describing the attribute itself (an arbitrary string such as GT or LT).

In some example embodiments, the communication device maintains a secret key of user u (SK_u), where u identifies the particular user of the communication device. The SK_u may be used to issue secret attribute keys to other users of other communication devices based on local trust level, according to some example embodiments of the current invention. The SK_u may also be used to generate the public key of attribute local trust (LT) for user u and the personalized secret keys of attribute local trust (LT) for other users u' who satisfy the access control conditions for the data encrypted by the above mentioned public key.

For example, for every attribute with representation GT there is a public key, denoted PK_GT, which is issued by the trusted server 106 and is used to encrypt communication data in order to control access based on the general trust level. By way of further example, for every attribute with representation (LT, u) there is a public key, denoted PK_(LT,u), which is generated by the communication device of user u. The PK_(LT,u) is used to encrypt communication data from the user u operating on the communication device and is further configured to control access based on the local trust level evaluated by the user u.

In some example embodiments, the corresponding secret attribute keys of PK_GT, which are personalized for eligible users, are issued by the trusted server 106 to the eligible users of communication devices, such as the first communication device 102 and/or second communication device 104. To prevent collusion or other attack, every user receives a personalized secret attribute key that is unique to the user. A secret attribute key of an attribute GT, issued for a user u is denoted as SK_(GT, u). A secret attribute key of the attribute LT, issued for an eligible user u' by user u is denoted as for example SK_(LT, u, u'). The set of secret keys that a user u' has (e.g., the key SK_u' and all keys SK_(GT,u'), SK_(LT,u,u')) is referred to as a key ring. A non-limiting list of keys related to but not limited to example embodiments of the current invention are summarized as below:

| Key | Description | Usage |
| --- | --- | --- |
| PK | Global key | Is an input for all operations |
| MK | Master key | Configured for the creation of user keys |
| PK_u | Public key of user u | Identification of user u and the key for verification of the user's attributes. Configured for creation of personalized secret attribute keys |
| SK_u | Secret key of user u | Decryption (to get personalized secret attribute keys) |
| SK_gt | Trusted server secret key of general trust attribute | Configured to create attribute keys of general trust |
| PK_GT | Public key of attribute General Trust | Encryption (of PSN communication) |
| SK_(GT,u) | Secret key of attribute General Trust for user u | Decryption (of PSN communication) |
| PK_(LT,u) | Public key of attribute Local Trust generated by user u | Encryption (of PSN communication of user u) |
| SK_(LT,u,u') | Secret key of attribute Local Trust for user u' issued by u | Decryption (of PSN communication of user u) |

In some example embodiments, a setup algorithm is performed by a trusted server 106. The setup algorithm is configured to input an implicit security parameter $1^k$. The setup algorithm is then configured to output the public key PK and the master key MK. Additionally, the setup algorithm may also be configured to generate a secret key SK_gt for the trusted server 106 for the purpose of general trust attribute related operations in the PSN.

In some example embodiments, an InitiateUser(PK, MK, u) algorithm is performed by a trusted server 106. The InitiateUser algorithm is configured to input the public key PK, the master key MK, and a user identity u (generally the unique user identity). The InitiateUser algorithm is further configured to output a public user key PK_u, that may be used by the trusted server 106 to issue personalized secret attribute keys for u, and a secret user key SK_u, used for the decryption of secured communications.

In some example embodiments, an IssueGeneralTrustPK (PK, GT, SK_gt) algorithm is performed by the trusted server 106. The IssueGeneralTrustPK algorithm is configured to be executed by the trusted server 106 in an instance in which a validity period of a previously issued public attribute key has expired. The IssueGeneralTrustPK algorithm is configured to determine the policies related to GT and the algorithm outputs a public attribute key for GT, denoted PK_GT.

In some example embodiments, an IssueGeneralTrustSK (PK, GT, SK_gt, u, PK_u) algorithm is performed by the trusted server 106. The IssueGeneralTrustSK algorithm is configured to be executed by the trusted server 106 in an instance in which a validity period of a secret attribute GT key has expired. The IssueGeneralTrustSK algorithm is configured to determine whether the user u with public key PK_u is eligible for the attribute GT (i.e., the user u's general trust level is equal or above an indicated level). If the user u is eligible for the attribute GT, then the algorithm IssueGeneralTrustSK is configured to output a secret attribute key SK_(GT, u) for eligible user u. Otherwise, the algorithm outputs NULL.

In some example embodiments, an CreateLocalTrustPK (PK, LT, SK_u). The CreateLocalTrustPK algorithm is executed by the user u device whenever the user would like to double control the access of his/her data (e.g., PSN communication messages). The CreateLocalTrustPK algorithm is configured to check the LT related policies. If this is the case, the algorithm outputs a public attribute key for the LT of user u, denoted PK_(LT, u), otherwise the algorithm outputs NULL.

In some example embodiments, an IssueLocalTrustSK (PK, LT, SK_u, u', PK_u') algorithm is performed by the communication device of user u. The IssueLocalTrustSK algorithm is configured to be executed by the user u (e.g., a first user operating a first communication device 102) device by checking the eligibility of u' (e.g. a second user operating a second communication device 104). The IssueLocalTrustSK algorithm is configured to determine whether the user u' with public key PK_u' is eligible for the attribute LT (e.g., the local trust level of u' is equal or above an indicated level). If the user u' is eligible to receive the attribute LT, then the IssueLocalTrustSK algorithm is configured to output a personalized secret attribute key SK_(LT, u, u') for user u'. Otherwise, the algorithm outputs NULL.

In some example embodiments, an Encrypt(PK, M, A, PK_GT, PK_(LT, u)) algorithm is performed by the communication device of user u. The Encrypt algorithm is configured to input the public key PK, a PSN communication data M, an access policy A and the public keys PK_GT, PK_(LT, u) corresponding to the general trust and local trust attributes occurring in the policy A. The algorithm encrypts M with the policy A and outputs the ciphertext CT (e.g. secured communication data). This encryption process may be conducted at a communication device of user u. Note that either PK_GT or, PK_(LT, u) or both can appear in the Encrypt algorithm, which depends on the access control policy defined in A. Concretely, if a user configures the access control to be based on the general trust level, the Encrypt algorithm may be simplified as Encrypt(PK, M, A, PK_GT). If the user configures the access control based on the local trust level evaluation results, then the Encrypt algorithm may simplified as Encrypt(PK, M, A, PK_(LT, u)). If the data access is controlled by both the general trust level and the local trust level, then the Encrypt algorithm is kept as described herein.

For example, one user may determine that users with general trust level over 4 and local trust level over 4 are permitted to access its secured communication data (e.g., the user's access policy). The user then may execute the encryption algorithm with an access policy defined as A1: GT_u>=4, and A2: LT_u>=4 to encrypt the data. In some example embodiments, a policy may be described in Disjunctive Normal Form (DNF). The policy in DNF can be written as $$AA=V_{j=1}^{n}(V_{A\in Sj}A) \tag{1}$$

where n (not pairwise disjoint) sets S1, . . . , Sn denote attributes that occur in the j-th conjunction of AA. The encryption algorithm iterates over all j=1, . . . , n, generates for each conjunction a random value R_j and constructs CT_j corresponding to each Sj. The ciphertext CT is obtained as tuple CT:=<CT_1, CT_2, . . . , CT_n>

In some example embodiments, a Decrypt(PK, CT, A, SK_u', SK_(GT, u'), SK_(LT, u, u')) algorithm is performed by the communication device of user u'. The Decrypt algorithm is configured to input a ciphertext and/or secured communication produced by the Encrypt algorithm with an access policy A, under which the communication data was encrypted, and a key ring SK_u', SK_(GT, u'), SK_(LU, u, u') for user u'. The algorithm Decrypt is configured to decrypt the ciphertext CT and further causes the corresponding plaintext M to be output if the attributes were sufficient to satisfy A; otherwise it outputs NULL.

Alternatively or additionally, either SK_(GT, u') or, SK_(LT, u, u') or both can appear in the Decrypt, which depends on the access control policy defined in A. In an instance in which a user controls access to data only based on the general trust level, the Decrypt algorithm may be simplified as Decrypt(PK, CT, A, SK_u', SK_(GT, u')). In an instance in which the user controls access his/her data only based on the local trust level evaluation results, the Decrypt algorithm may be simplified as Decrypt(PK, CT, A, SK_u', SK_(LT, u, u')). If the data access is controlled by both the general trust level and the local trust level, the Decrypt algorithm remains as is described herein.

Figure 5:
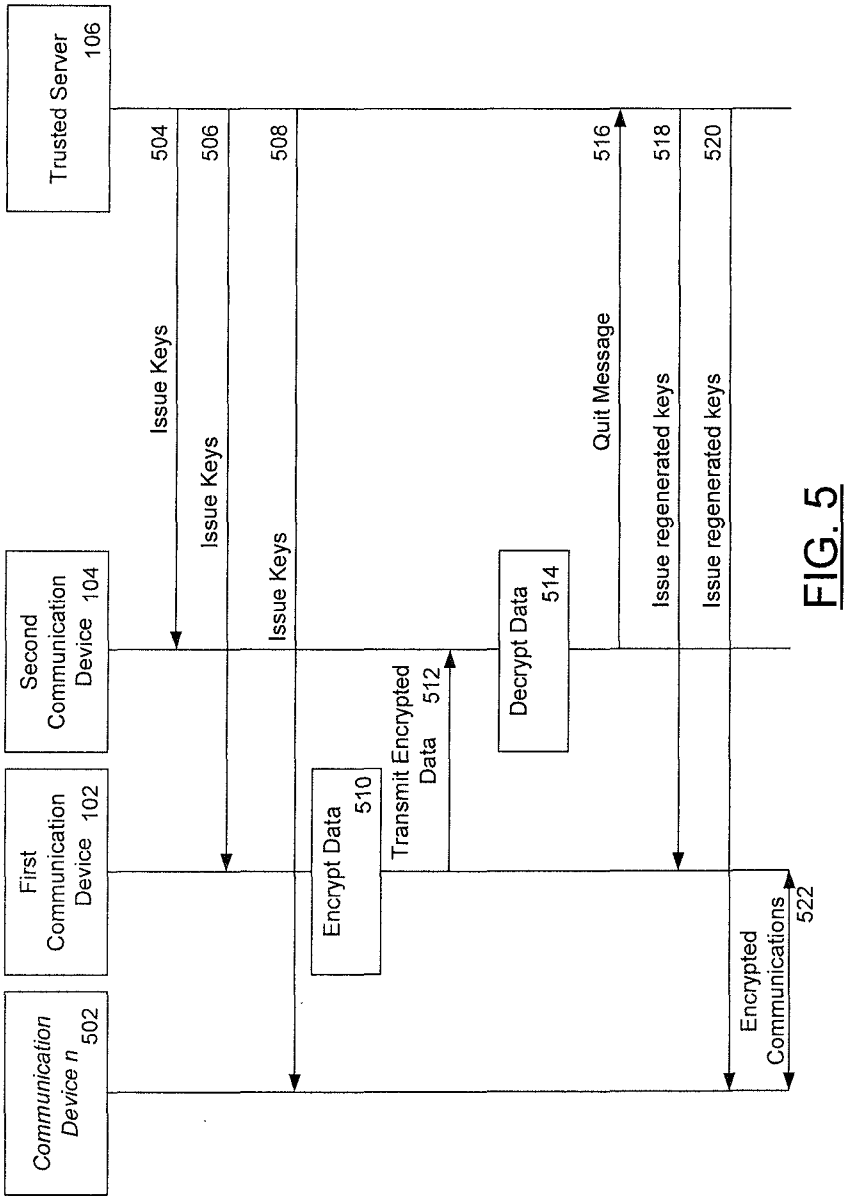
FIG. 5 illustrates an example signal flow diagram showing example communication access that is controlled by a general trust level according to some example embodiments.

FIG. 5 illustrates an example signal flow diagram showing example data access that is controlled by a general trust level. In some example embodiments, the general trust level controlled access keys (e.g., encryption public keys (PK_GT) and personalized decryption keys (SK_(GT, u)) that may be generated and issued by the trusted server 106 (e.g., periodically). The trusted server 106 may further be configured to evaluate the general trust level of the users, such as but not limited to the first communication device 102, the second communication device 104 and/or communication device n 402. The trusted server 106 may then be configured to generate encryption public keys and personalized decryption secret keys of attributes (e.g., attribute GT) and to issue the keys (public encryption keys and personalized decryption keys) to the communication devices as is shown with reference to signals 504-508.

In order to secure PSN communications, the user, such as the user of the first communication device 102 may be configured to encrypt a secure transmission based on preset personal access policies using corresponding public keys PK_GT as is shown in box 510. The first communication device 102 may then cause the secured transmission to be broadcast to nearby users, such as the second communication device 104, as is shown in signal 512. A user, such as a user of the second communication device, may check the encryption policy A, such as the personal access policy, and then if eligible may be configured to use the personalized decryption key SK_(GT, u) to decrypt the received secured transmission.

In some example embodiments, a user, such as the user of the second communication device 104 may quit from the PSN by sending a request to the trusted server 106 as is shown in signal 516. Alternatively the second communication device 104 may quit by leaving a geographic area and/or the like. In response to a quit message, the trusted server 106 is configured to not transmit new or regenerated keys to the second communication device 104 in an instance in which the current keys expire.

The trusted server 106 is further configured to monitor a time period and may determine that one or more current keys validity period has expired. The trusted server 106 may then reevaluate the general trust level and regenerate the encryption public keys and the personalized decryption secret keys. As is shown in signals 518 and 520, the regenerated keys are issued to the remaining communication devices providing they satisfy the required trust level. The remaining communication devices, first communication device 102 and communication device n 502 are then setup for secure communications.

Figure 6:
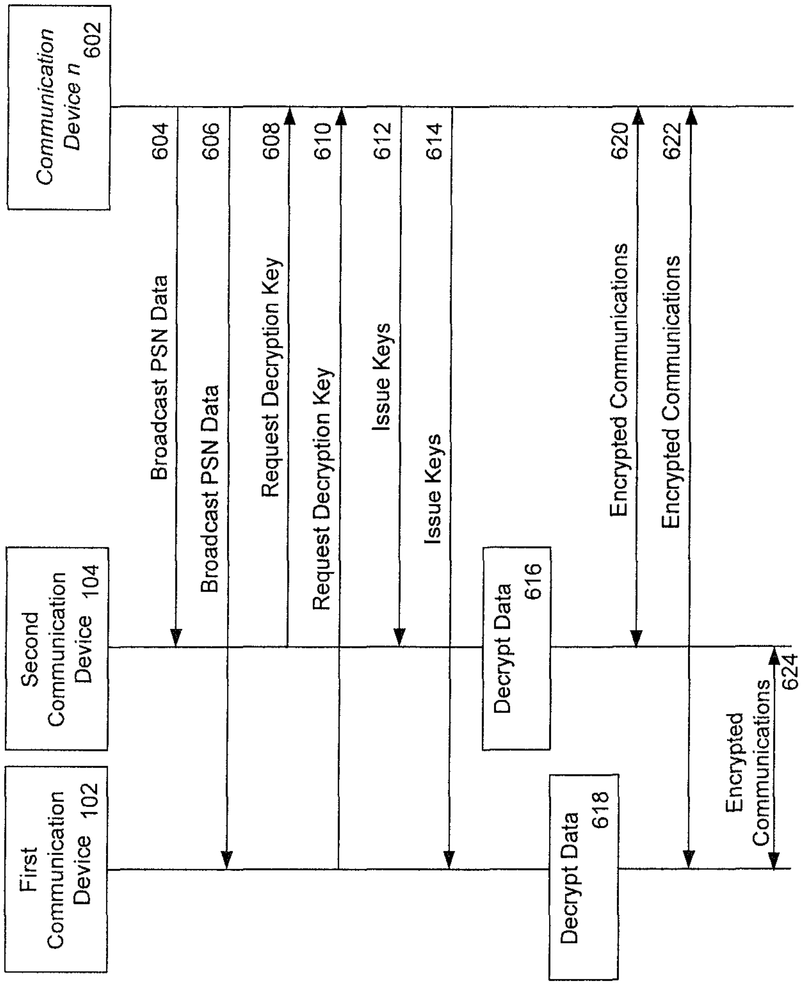
FIG. 6 illustrates an example signal flow diagram showing example communication access that is controlled by a local trust level in an instance in which a trusted server is not available according to some example embodiments.

FIG. 6 illustrates an example signal flow diagram showing example communications access that is controlled by a local trust level in an instance in which a trusted server 106 is not available. In some example embodiments, each communication device may be configured to generate an encryption key and corresponding personalized secret key based on a local trust level for decryption. The communication devices, such as the first communication device 102, the second communication device 104 and/or the communication device n 602, may issue the secret keys to those users that satisfy the decryption conditions. The communication devices may then broadcast encrypted messages to nearby communication devices.

Alternatively or additionally, in an instance in which the local trust levels of some users of communication devices has changed, the issuing communication device may regenerate keys for encrypting and/or decrypting future communications data and cause the regenerated keys to be transmitted to eligible users.

In some example embodiments, a communication device n 602 may be configured to set an access policy and generate encryption keys in order to protect PSN communication data. The communication device n 602 may then encrypt a communication based on the access policy and cause it to be broadcast to nearby users such as the first communication device 102 and the second communication device 104 as is shown in signals 604 and 606. After detecting the broadcast message in signals 604 and 606, the first communication device 102 and the second communication device 104 may determine a local trust value of the user of communication device n 602. Based on the local trust value, the first communication device 102 and the second communication device 104 may determine whether to communicate with the user of communication device n 602. If it is determined to communicate with the user of communication device n 602, then the first communication device 102 and the second communication device 104 may request a decryption key as is shown in signals 608 and 610 from the communication device n 602. In response the communication device may determine the local trust level of the first communication device 102 and the second communication device 104 and if determined to be eligible, the communication device n 602 respectively issues personalized decryption keys to the first communication device 102 and the second communication device 104 as is shown in signals 612 and 614.

The first communication device 102 and the second communication device 104 may decrypt messages from the communication device n 602 based on personal access policies using corresponding secret keys SK_(LT, u, u') as is show in blocks 616 and 618. As is shown in signals 620-624, encrypted communications may be performed among the various communication devices based on the local trust value.

Alternatively or additionally, the communication device n 602 is further configured to monitor a time period and may determine that one or more current keys validity period has expired. The communication device n 602 may then reevaluate the local trust level and regenerate the encryption public keys and the personalized decryption secret keys for later secure communications in PSN.

Figure 7:
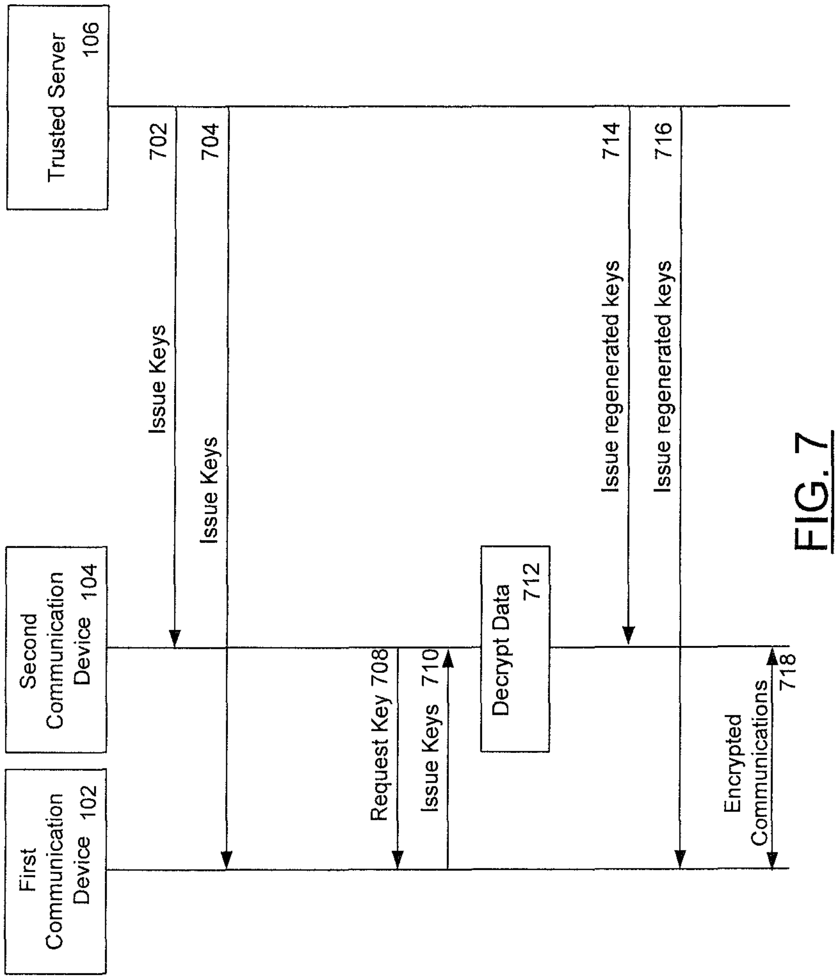
FIG. 7 illustrates an example signal flow diagram showing example communication access that is controlled by both a local trust level and a general trust level in an instance in which a trusted server is available according to some example embodiments.

FIG. 7 illustrates an example signal flow diagram showing example data access that is controlled by both a local trust level and a general trust level in an instance in which a trusted server is available. In some example embodiments, in an instance in which a trusted server 106 is available and a user of a communication device also determines that communications data is to be secured also based on a local trust level, the user may secure transmissions using both a local trust level and a general trust level. In such cases, a communication device controls access to communications based on the keys generated/issued by the trusted server and the keys that the communication device itself generates.

The trusted server 106 may be configured to evaluate the general trust level of the users of the first communication device 102 and/or the second communication device 104. The trusted server 106 may then be configured to generate encryption public keys and personalized decryption secret keys of attributes (e.g., attribute GT). The trusted server 106 may then be configured to issue the keys (public encryption keys and personalized decryption keys) to the communication devices as is shown with reference to signals 702-704.

In some example embodiments, a first communication device 102 is configured to set an access policy and generate encryption keys in order to further protect its communication data. The first communication device 102 may then encrypt a communication based on the access policy and cause it to be broadcast to nearby users such as the second communication device 104. After detecting the broadcast message, the second communication device 104 may determine a local trust value of the user of first communication device 102 and based on the local trust value determine whether to communicate with the user of first communication device 102. If the local trust value is satisfied, then the second communication device 104 may request a decryption key as is shown in signal 708 from the first communication device 102. In response the first communication device 102 may determine the local trust level of the second communication device 104 and if eligible, the first communication device 102 may issue keys (e.g., personalized decryption keys) to the second communication device 104 as is shown in signal 710. The second communication device 104 may decrypt messages from the first communication device 102 of user u based on personal access policies using corresponding secret keys SK_(LT, u, u') and SK_(GT, u) as is show in blocks 712.

The trusted server 106 is further configured to monitor a time period and may determine that one or more current keys validity period has expired. The trusted server 106 may then reevaluate the general trust level and regenerate the encryption public keys and the personalized decryption secret keys. As is shown in signals 714 and 716 the regenerated keys may be issued to the communication devices. Alternatively or additionally, the first communication device 102 of user u is further configured to monitor a time period and may determine that one or more current keys validity period has expired. The first communication device 102 may then reevaluate the local trust level and regenerate the encryption public keys and the personalized decryption secret keys. As is shown in signal 718, the communication devices may engage secure communications that are then protected by both the general trust level and the local trust level using the newly issued or generated or requested keys.

FIGS. 8-11 illustrate example flowcharts of a system, method, and computer program product according to example embodiments of the invention. It will be understood that each block of the flowcharts, and combinations of blocks in the flowcharts, may be implemented by various means, such as hardware and/or a computer program product comprising one or more computer-readable mediums (as opposed to a computer-readable transmission medium which describes a propagating signal) having one or more computer program code instructions, program instructions, or executable computer-readable program code instructions stored therein. For example, one or more of the procedures described herein may be embodied by computer program instructions of a computer program product. In this regard, the computer program product(s) that embodies the procedures described herein may be stored by one or more memory devices (for example, memory 312, memory 412, volatile memory 40, or non-volatile memory 42) of a communication device, trusted server, or other computing device (for example, the first communication device 102, and/or the second communication device 104) and executed by a processor (for example, the processor 310, the processor 410 or processor 20) in the computing device. In some embodiments, the computer program instructions comprising the computer program product(s) that embodies the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowcharts' block(s).

Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowcharts' block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together.

Accordingly, execution of instructions associated with the operations of the flowchart by a processor, or storage of instructions associated with the blocks or operations of the flowchart in a computer-readable storage medium, support combinations of operations for performing the specified functions. It will also be understood that one or more operations of the flowchart, and combinations of blocks or operations in the flowchart, may be implemented by special purpose hardware-based computer systems and/or processors which perform the specified functions, or combinations of special purpose hardware and program code instructions.

Figure 8:
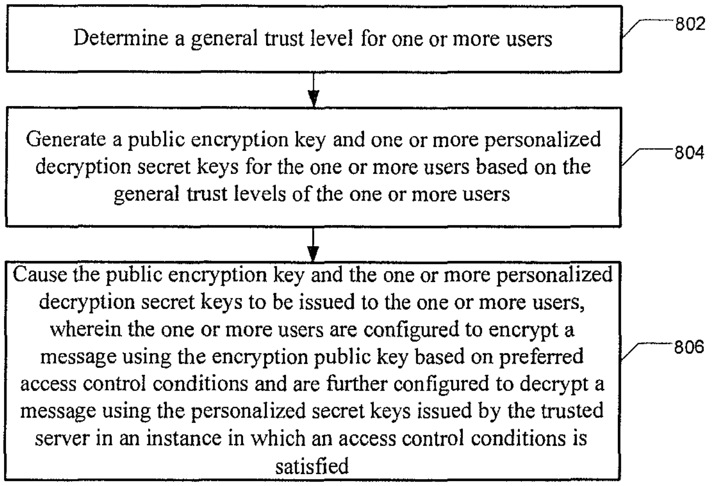
FIG. 8 illustrates a flowchart according to an example method configured to be executed by a trusted server according to some example embodiments.

FIG. 8 illustrates a flowchart according to an example method configured to be executed by a trusted server according to some example embodiments of the current invention. As is shown in operation 802, the trusted server 106, may comprise means, such as the processor 410, the trust distributor 414, the trust generator/predictor 418, or the like, for determining a general trust level for one or more users. As is shown in operation 804, the trusted server 106, may comprise means, such as the processor 410, or the like, for generating a public encryption key and one or more personalized decryption secret keys for the one or more users based on the general trust levels of the one or more users. As is shown in operation 806, the trusted server 106, may comprise means, such as the processor 410, or the like, for causing the public encryption key and the personalized decryption secret key to be issued to the one or more users, wherein the one or more users are configured to encrypt a message using the encryption public key based on preferred access control conditions and are further configured to decrypt a message using the personalized secret keys issued by the trusted server in an instance in which an access control conditions is satisfied.

Figure 9:
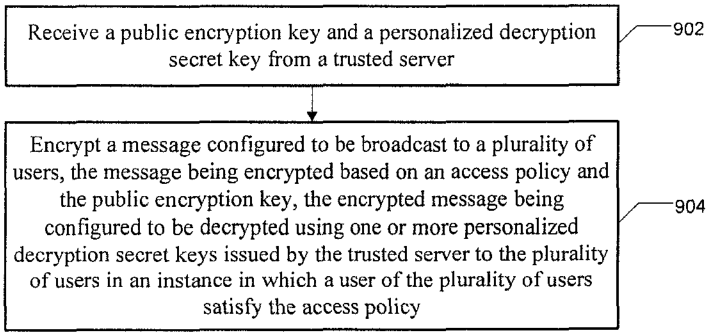
FIG. 9 illustrates a flowchart according to an example method configured to be executed by a communication device according to some example embodiments.

FIG. 9 illustrates a flowchart according to an example method configured to be executed by a communication device according to some example embodiments of the current invention. As is shown in operation 902, the first communication device 102 and/or the second communication device 104, may comprise means, such as the processor 310, a communications interface 314 or the like, for receiving a public encryption key and a personalized decryption secret key from a trusted server. As is shown in operation 904, the first communication device 102 and/or the second communication device 104, may comprise means, such as the processor 310, a communications interface 314 or the like, for encrypting a message configured to be broadcast to a plurality of users, the message being encrypted based on an access policy using the public encryption key and the encrypted message being configured to be decrypted using one or more personalized decryption secret keys issued by the trusted server to the plurality of users in an instance in which a user of the plurality of users satisfy the access policy. In some example embodiments the received public encryption key comprises the public key of attribute general trust (PK_GT) and the personalized decryption secret key comprises the secret key of attribute general trust of user u (SK_u)(GT,u)). In further example embodiments, a user of the plurality of users maintains a public key for user u (PK_u), wherein the PK_u comprises a user identification and a key to verify an access attribute and a user of the plurality of users maintains a secret key for user u (SK_u), wherein the SK_u comprises decryption information configured to access the personalized decryption secret key.

Figure 10:
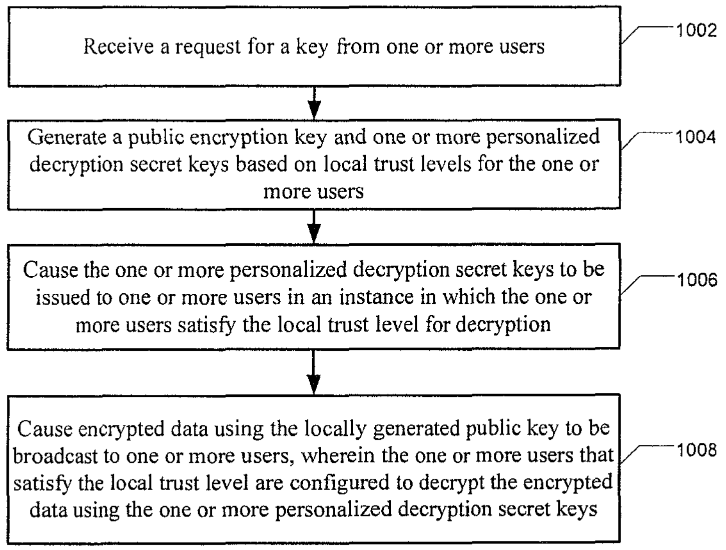
FIG. 10 illustrates a flowchart according to an example method configured to be executed by a communication device according to some example embodiments.

FIG. 10 illustrates a flowchart according to an example method configured to be executed by a communication device according to some example embodiments of the current invention. As is shown in operation 1002, the first communication device 102 and/or the second communication device 104, may comprise means, such as the processor 310, a communications interface 314 or the like, for receiving a request for a key from one or more users. As is shown in operation 1004, the first communication device 102 and/or the second communication device 104, may comprise means, such as the processor 310 or the like, for generating a public encryption key and one or more personalized decryption secret keys based on local trust levels for the one or more users.

As is shown in operation 1006, the first communication device 102 and/or the second communication device 104, may comprise means, such as the processor 310, a communication interface 314 or the like, for causing the personalized decryption secret keys to be issued to one or more users in an instance in which the one or more users satisfy the local trust level for decryption. As is shown in operation 1008, the first communication device 102 and/or the second communication device 104, may comprise means, such as the processor 310, a communications interface 314 or the like, for causing encrypted data using the locally generated public key to be broadcast to one or more users, wherein the one or more users are configured to decrypt the encrypted data using the personalized decryption keys based on an access policy and in an instance in which a local trust level is applied.

Figure 11:
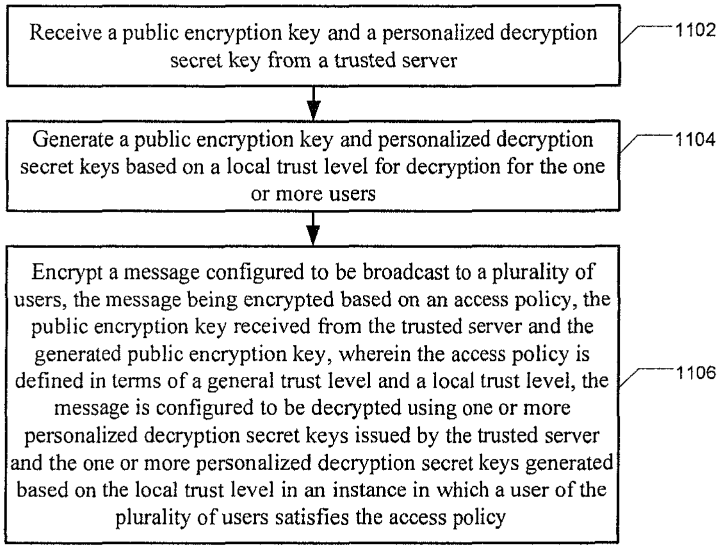
FIG. 11 illustrates a flowchart according to an example method configured to be executed by a communication device according to some example embodiments.

FIG. 11 illustrates a flowchart according to an example method configured to be executed by a communication device according to some example embodiments of the current invention. As is shown in operation 1102, the first communication device 102 and/or the second communication device 104, may comprise means, such as the processor 310, a communications interface 314 or the like, for receiving public encryption key and a personalized decryption secret key from a trusted server. As is shown in operation 1104, the first communication device 102 and/or the second communication device 104, may comprise means, such as the processor 310 or the like, for generating a public encryption key and one or more personalized decryption secret keys based on a local trust level for decryption of the one or more users. As is shown in operation 1106, the first communication device 102 and/or the second communication device 104, may comprise means, such as the processor 310, a communications interface 314 or the like, for encrypting a message configured to be broadcast to a plurality of users, the message being encrypted based on an access policy using the public encryption key received from the trusted server and the locally generated public encryption key. In some example embodiments, the access policy is defined in terms of a general trust level and a local trust level. Further, the message is configured to be decrypted using one or more personalized decryption secret keys issued by the trusted server and the one or more personalized decryption secret keys generated based on the local trust level in an instance in which a user of the plurality of users satisfies the access policy.

The above described functions may be carried out in many ways. For example, any suitable means for carrying out each of the functions described above may be employed to carry out embodiments of the invention. In example embodiments, a suitably configured processor (for example, the processor 310 and/or processor 410) may provide all or a portion of the elements of the invention. In other embodiments, all or a portion of the elements of the invention may be configured by and operate under control of a computer program product. The computer program product for performing the methods of embodiments of the invention may comprise a computer-readable storage medium, such as the non-volatile storage medium (for example, the memory 312 and/or memory 412), and computer-readable program code portions, such as a series of computer instructions, embodied in the computer-readable storage medium.

Advantageously, the systems and methods described herein provide a flexible system to control data access in a PSN without regard to the presence of a trusted server. The systems and methods described herein are configured to support pure distributed access control, pure centralized access control and/or hybrid access control solutions. Further the systems and methods described herein support various access control demands in pervasive social networking that require trust management support. As described herein general access control policies decided by the trusted server and/or personal access control policies handled by individual users are supported. As is described herein security is based on the attributed-based encryption theory. Security is further ensured by fine-grained encryption mechanism control by the general trust level and/or the local trust level.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. An apparatus comprising:

at least one processor; and at least one memory comprising computer program code, the at least one memory and the computer program code configured to, with the at least one processor, cause the apparatus to at least:

receive, from a server, a first public encryption key for the apparatus, wherein the first public encryption key is received based on at least a general trust level, the general trust level based on at least interactions by a plurality of users with one or more entities across a network;

generate a second public encryption key for the apparatus;

generate, based on at least the first and second public encryption keys, at least one encrypted message;

determine a local trust level for a user, the local trust level based on at least interaction between the user at a communication device and the apparatus, the plurality of users including the user;

generate, when the local trust level for the user satisfies an access policy for the apparatus, one or more secret decryption keys for the user; and cause the one or more secret decryption keys to be sent to the user at the communication device, wherein issuance of the one or more secret decryption keys enables the user to decrypt, via the communication device, the at least one encrypted message.

2. An apparatus according to claim 1, wherein the at least one memory comprising the computer program code is further configured to, with the at least one processor, cause the apparatus to at least:

determine whether the one or more secret decryption keys has expired;

determine an updated local trust level for the user;

generate one or more second secret decryption keys for the user, based on at least the updated local trust level; and cause the one or more second secret decryption keys to be issued to the user.

3. An apparatus according to claim 1, wherein the at least one memory comprising the computer program code is further configured to, with the at least one processor, cause the apparatus to at least:

receive a request from a second user to be removed from a list of users identified to receive regenerated public encryption keys and secret decryption keys; and cause the second user to be removed from the list.

4. An apparatus according to claim 1, wherein one or more user devices associated with the user are configured to at least decrypt the at least one encrypted message using the one or more secret decryption keys, based on at least preferred access control conditions, and in an instance in which an access control condition is satisfied.

5. An apparatus according to claim 1, wherein the at least one memory comprising the computer program code is further configured to, with the at least one processor, cause the apparatus to at least:

regenerate, in response to the local trust level for the user being changed, the second public encryption key and the one or more secret decryption keys; and cause the regenerated one or more secret decryption keys to be issued to the user.

6. An apparatus according to claim 1, wherein the at least one memory comprising the computer program code is further configured to, with the at least one processor, cause the apparatus to at least:

receive, from the user, a request for the one or more secret decryption keys, wherein the local trust level for the user is determined in response to the request.

7. An apparatus according to claim 1, wherein the plurality of users form at least a portion of a mobile ad-hoc network.

8. A method comprising:

receiving, at a communication device and from a server, a first public encryption key for the communication device, wherein the first public encryption key is received based on at least a general trust level, the general trust level based on at least interactions by a plurality of users with one or more entities across a network;

generating, at the communication device, a second public encryption key for the communication device;

generating, at the communication device and based on at least the first and second public encryption keys, at least one encrypted message;

determining, at the communication device, a local trust level for a user, the local trust level based on at least interaction between the user at another communication device and the communication device, the plurality of users including the user;

generating, at the communication device and when the local trust level for the user satisfies an access policy for the communication device, one or more secret decryption keys for the user; and causing, via the communication device, the one or more secret decryption keys to be sent to the user at the other communication device, wherein issuance of the one or more secret decryption keys enables the user to decrypt, via the other communication device, the at least one encrypted message.

9. A method according to claim 8, further comprising:

determining, at the communication device, whether the one or more secret decryption keys has expired;

determining, at the communication device, an updated local trust level for the user;

generating, at the communication device, one or more second secret decryption keys for the user, based on at least the updated local trust level; and causing, via the communication device, the one or more second secret decryption keys to be issued to the user.

10. A method according to claim 8, further comprising:

receiving, at the communication device, a request from a second user to be removed from a list of users identified to receive regenerated public encryption keys and secret decryption keys; and causing, via the communication device, the second user to be removed from the list.

11. A method according to claim 8, further comprising:

regenerating, at the communication device and in response to the local trust level for the user being changed, the second public encryption key and the one or more secret decryption keys; and causing, via the communication device, the regenerated one or more secret decryption keys to be issued to the user.

12. A method according to claim 8, further comprising:

receiving, at the communication device and from the user, a request for the one or more secret decryption keys, wherein the local trust level for the user is determined in response to the request.

13. A non-transitory computer-readable medium comprising computer program code which, when executed by at least one processor, result in operations comprising:

receiving, at a communication device and from a server, a first public encryption key for the communication device, wherein the first public encryption key is received based on at least a general trust level, the general trust level based on at least interactions by a plurality of users with one or more entities across a network;

generating, at the communication device, a second public encryption key for the communication device;

generating, at the communication device and based on at least the first and second public encryption keys, at least one encrypted message;

determining, at the communication device, a local trust level for a user, the local trust level based on at least interaction between the user at another communication device with the communication device, the plurality of users including the user;

generating, at the communication device and when the local trust level for the user satisfies an access policy for the communication device, one or more secret decryption keys for the user; and causing, via the communication device, the one or more secret decryption keys to be sent to the user at the other communication device, wherein issuance of the one or more secret decryption keys enables the user to decrypt, via the other communication device, the at least one encrypted message.

14. A non-transitory computer-readable medium according to claim 13, wherein the operations further comprise:

determining, at the communication device, whether the one or more secret decryption keys has expired;

determining, at the communication device, an updated local trust level for the user;

generating, at the communication device, one or more second secret decryption keys for the user, based on at least the updated local trust level; and causing, via the communication device, the one or more second secret decryption keys to be issued to the user.

15. A non-transitory computer-readable medium according to claim 13, wherein the operations further comprise:

receiving, at the communication device, a request from a second user to be removed from a list of users identified to receive regenerated public encryption keys and secret decryption keys; and causing, via the communication device, the second user to be removed from the list.

16. A non-transitory computer-readable medium according to claim 13, wherein one or more user devices associated with the user are configured to at least decrypt the at least one encrypted message using the one or more secret decryption keys, based on at least preferred access control conditions, and in an instance in which an access control condition is satisfied.

17. A non-transitory computer-readable medium according to claim 13, wherein the operations further comprise:

regenerating, at the communication device and in response to the local trust level for the user being changed, the second public encryption key and the one or more secret decryption keys; and causing, via the communication device, the regenerated one or more secret decryption keys to be issued to the user.

18. A non-transitory computer-readable medium according to claim 13, wherein the operations further comprise:

receiving, at the communication device and from the user, a request for the one or more secret decryption keys, wherein the local trust level for the user is determined in response to the request.

* * * * *